July 12, 1966   H. ÖSTEN NORDGREN   3,260,226
LIGHT-WEIGHT PALLET
Filed June 1, 1964
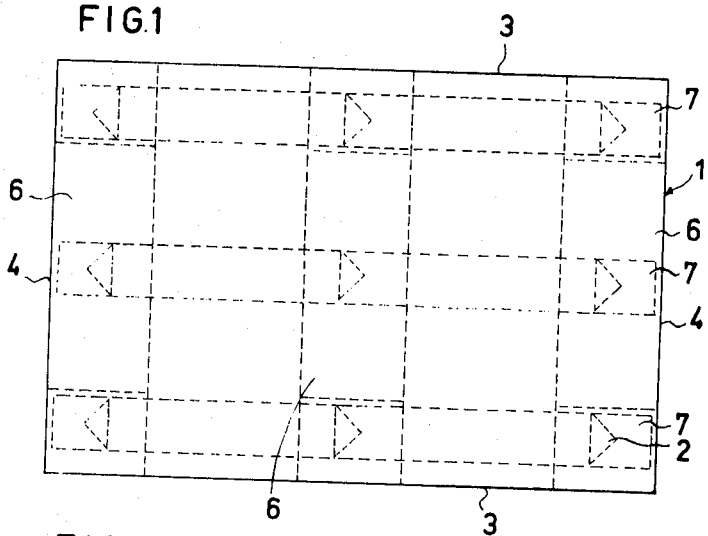
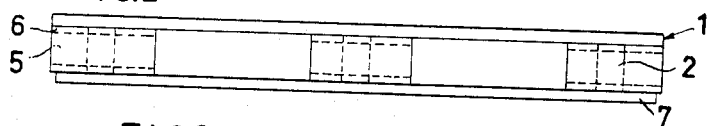
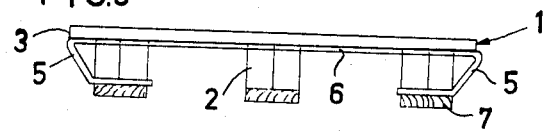
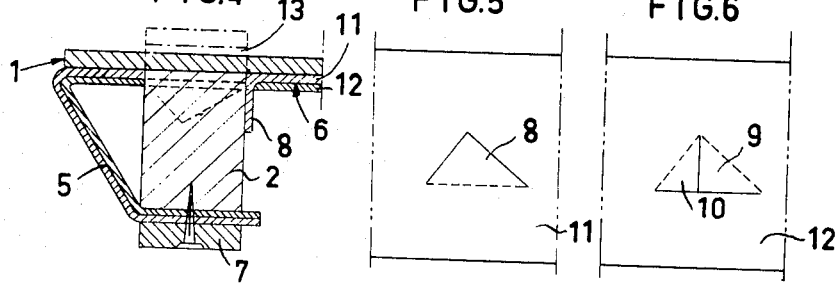
Hugo Östen Nordgren
Inventor
By Wenderoth, Lind & Ponack
Attorneys

United States Patent Office 3,260,226
Patented July 12, 1966

3,260,226
LIGHT-WEIGHT PALLET
Hugo Östen Nordgren, Bergsunds Strand 31,
Stockholm, Sweden
Filed June 1, 1964, Ser. No. 371,341
Claims priority, application Sweden, June 11, 1963,
6,428/63
3 Claims. (Cl. 108—51)

The present invention relates to a pallet which is particularly adapted for conveyance by forklift trucks and similar transport vehicles, and comprises a preferably rectangular load supporting platform consisting of one or more layers of corrugated board or similar light-weight material, said load supporting platform being maintained at a certain height over the base by a plurality of support means arranged at the underside of the platform and so dimensioned and spaced apart as to permit insertion of lifting means, such as truck lift forks, beneath the platform. The invention is essentially characterized by the fact that the light-weight material of the platform is provided with flaps projecting at least from one pair of opposite platform sides and located opposite adjoining support means, the said flaps being bent down from the platform sides toward the said support means and secured to the ends of the support means facing away from the platform. The invention provides an extraordinarily stable pallet which is cheap in manufacture and of so low a weight that it is negligible in regard of transport costs.

The above and further features of the invention and the advantages gained thereby will become apparent from the following description, reference being made to the accompanying drawing which illustrates an embodiment of the pallet chosen by way of example. In the drawing:

FIG. 1 is a top plan view of the pallet;
FIG. 2 is a side elevational view thereof,
FIG. 3 is an end view thereof,
FIG. 4 is a section, on a larger scale, of one of the support means of the pallet and the adjoining portions thereof,
FIGS. 5 and 6 are views showing minor portions of a pair of light-weight material layers of the pallet.

The load supporting platform 1 of the pallet consists of preferably corrugated and/or laminated light-weight material such as paper, cardboard or fibre board. The platform 1 suitably comprises one or more layers of corrugated board, the various layers being interconnected by means of some suitable adhesive. The platform 1 may also consist of double-double corrugated board. The size of the platform 1 may of course vary within broad limits but it should preferably be given such a size as to correspond to the measures established by the provisions in force.

The platform 1 has a plurality of support means 2 arranged at the underside of the platform 1 at spaced intervals. These support means are preferably nine in number and arranged in three rows both longitudinally and transversely of the platform 1, the outermost rows being situated close to the sides of the platform 1. The long sides of the pallet are designated 3 and the short sides 4.

According to the invention, the light-weight material of the platform 1 is formed with flaps 5 projecting from the long sides 3 of the platform 1 and situated opposite the adjoining support means 2. From the sides 3 of the platform 1 the flaps 5 are bent down toward the support means 2 which are situated short of the sides 3, and the flaps are secured to the ends of the support means 2 facing away from the platform 1.

In a preferred embodiment, the platform 1 is constituted by one or more whole layers of light-weight material and by relatively narrow strips 6 of light-weight material disposed at the underside of said layers of light-weight material, the ends of said strips 6 forming the flaps 5. The strips 6 must not be so broad that the flaps 5 prevent truck lift forks and similar means from penetrating into the spaces between the support means 2.

The strips 6 glued to the platform 1 are parallel with the short sides 4 of the platform 1, while ribs 7 of wood or like material connected with the ends of the support means 2 facing away from the platform 1, are parallel with the long sides 3 thereof. The strips 6 and the ribs 7 in combination make the platform 1 extraordinarily stable.

The support means 2 preferably consist of blocks of wood or similar material that permits nailing, and the strips 7 are nailed to the ends of the blocks facing away from the platform 1. It is recommended to dispose the ends of the flaps 5 between the blocks 2 and ribs 7 in the manner appearing from the drawing.

The support means or blocks 2 are passed through conforming openings in at least one layer of the light-weight material of the platform 1, and the flaps 8–10 of light-weight material resulting from said cut-out openings engage the support means 2 for the fixation thereof to the platform 1. More precisely, the flaps 8–10 are glued or otherwise adhered to the support means 2.

The blocks 2 are parallelepipeds having plane sides and a triangular cross section. Normally, one of the angles of the triangular cross section will be a right angle. The cross section may be isosceles but need not necessarily be so.

The strips 6 comprise two glued-together layers 11 and 12 which both have openings for the support means 2. The openings in the layer 11 are provided at one of their edges corresponding to the plane sides of the support means 2 with a flap 8, while the openings in the layer 12 are provided at their two edges corresponding to the other plane sides of the support means 2, with flaps 9 and 10.

As will appear from the drawing the longest side of of the triangular cross section of the support means 2 is parallel with the longitudinal direction of the strip 6 and thus with the sides 4, the opposite apex facing the nearest one of the sides 4. As a consequence, in the middle row said apices may face any one of the sides 4. Such an orientation of the support means 2 will give the pallet the greatest strength.

In the embodiment illustrated the blocks 2 end at the underside of the loading platform. In another embodiment indicated by dash and dot lines in FIG. 4 the blocks 2 may extend through the platform 1, in which case they have their upper ends preferably formed as fastenings for a carton of e.g. corrugated board or lightweight material, which carton should be collapsible in its unmounted state. On a level with the upper side of the platform 1 the blocks 2 may have grooves 13 in which the edges of recesses in the carton bottom are adapted to engage.

The above embodiments of the invention were described for purposes of illustration rather than limitation. Variations and modifications of the invention are possible within the scope of the appended claims.

What I claim and desire to secure by Letters Patent is:
1. A pallet for conveyance by fork lift trucks and similar transport vehicles, comprising a rectangular load supporting platform of corrugated light-weight material, a plurality of support means arranged at the under side of said load supporting platform to maintain said platform at a predetermined height from a supporting surface, said support means being so dimensioned and spaced to permit insertion of lifting means beneath said platform, said platform having flaps projecting from opposite platform sides located opposite said support means, said flaps being bent from the side of the platform obliquely downwardly and inwardly towards said support means and secured thereto to form stays therefor, said flaps being constituted by the ends of strips of light-weight material arranged at the underside of said platform at spaced intervals, said strips being substantially as broad as said flaps.

2. A pallet in accordance with claim 1 wherein said strips are parallel with one pair of opposite sides of the platform and ribs of wood are connected with the ends of said support means facing away from said platform parallel with the other pair of opposite sides of said platform.

3. A pallet in accordance with claim 2, wherein said support means are blocks of material that permit nailing and said ribs being nailed to the ends of the blocks facing away from the platform.

References Cited by the Examiner
UNITED STATES PATENTS

| | | | |
|---|---|---|---|
| 2,503,240 | 4/1950 | Cahners | 108—56 |
| 2,762,551 | 9/1956 | Fallert | 108—55 X |
| 2,841,350 | 7/1958 | Chronister | 108—56 |
| 2,970,797 | 2/1961 | Desbois | 108—56 |
| 3,026,078 | 3/1962 | Simkins | 108—56 |
| 3,041,029 | 6/1962 | Brown | 108—58 X |
| 3,055,624 | 7/1962 | Wilson | 108—58 |
| 3,069,059 | 12/1962 | Desbois | 108—55 X |

FRANK B. SHERRY, *Primary Examiner.*

G. O. FINCH, *Assistant Examiner.*